F. SULLIVAN.
IRRIGATION APRON.
APPLICATION FILED OCT. 9, 1919.

1,363,691.

Patented Dec. 28, 1920.

Inventor
Frank Sullivan

By Herbert E. Smith
Attorney

UNITED STATES PATENT OFFICE.

FRANK SULLIVAN, OF CUSICK, WASHINGTON.

IRRIGATION-APRON.

1,363,691.  Specification of Letters Patent.  Patented Dec. 28, 1920.

Application filed October 9, 1919. Serial No. 329,567.

*To all whom it may concern:*

Be it known that I, FRANK SULLIVAN, a citizen of the United States, residing at Cusick, in the county of Pend Oreille and State of Washington, have invented certain new and useful Improvements in Irrigation-Aprons, of which the following is a specification.

The present invention relates to an improved irrigation apron in the form of a flexible covering or protector to be used at the junction of irrigating ditches, to prevent erosion or washing away of the soil, and also provided for the purpose of furnishing a dam in the main ditch in order to back up the water and divert its flow through a lateral or side ditch.

The primary object of the invention is the provision of such a device that is comparatively inexpensive in cost of production, is durable, and may be conveniently packed for storing or transportation, as will be hereinafter more particularly described and claimed.

In the accompanying drawings I have illustrated one complete example of the physical embodiment of my invention as used by me in the irrigation ditches where the soil is very light, as for instance volcanic ash, and wherein the apron has performed its functions efficiently and in satisfactory manner.

Figure 4:
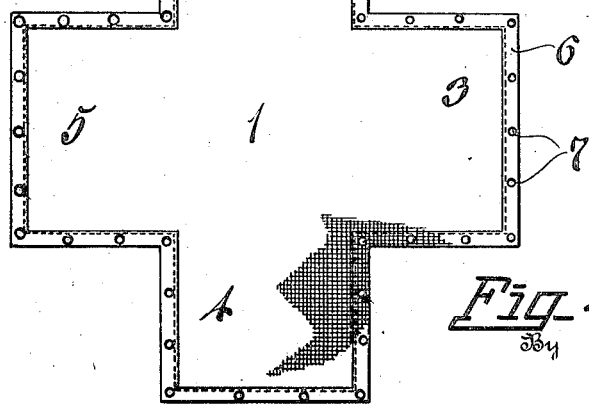
Fig. 4 is a plan view of the cruciform apron or protector.

In the form of the invention illustrated particularly in Fig. 4 the cruciform apron 1 is preferably made of flexible material, such as canvas, and the wings 2, 3, 4 and 5 are provided with a hem or border 6 of suitable material, extending around all of the edges and securely stitched or otherwise secured to the body of the apron, and at regular intervals eyelets or openings 7 are provided through the hem as shown.

Figure 1:
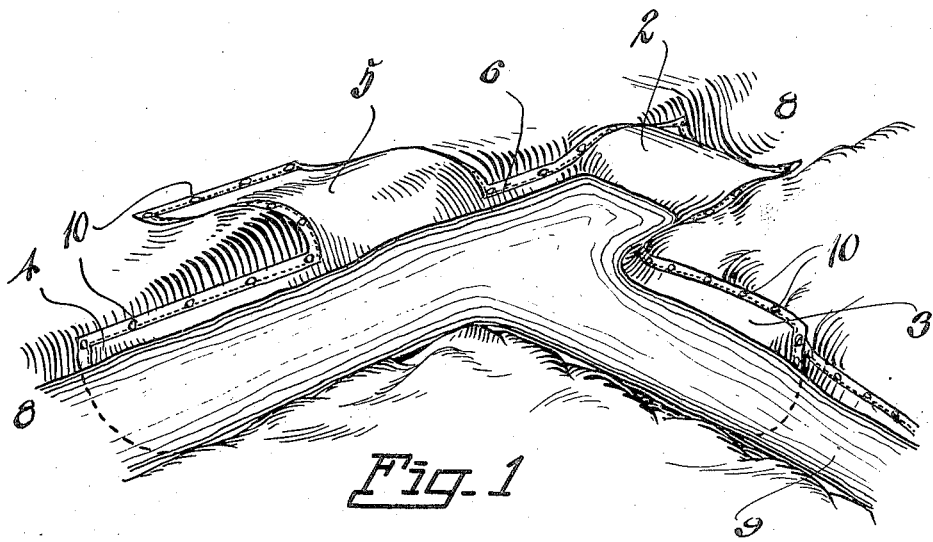
Figure 1 is a perspective view showing a main irrigating ditch and a single lateral or side ditch extending therefrom, wherein the apron or protector is used to form a dam to divert the water to the lateral, and to act as a trough for the water as it passes out of the main ditch into the lateral.
Figure 2:
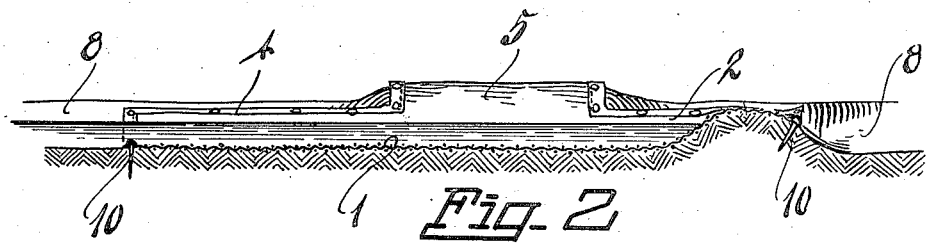
Fig. 2 is a vertical longitudinal section through the main ditch in Fig. 1 showing especially the dam construction.
Figure 3:
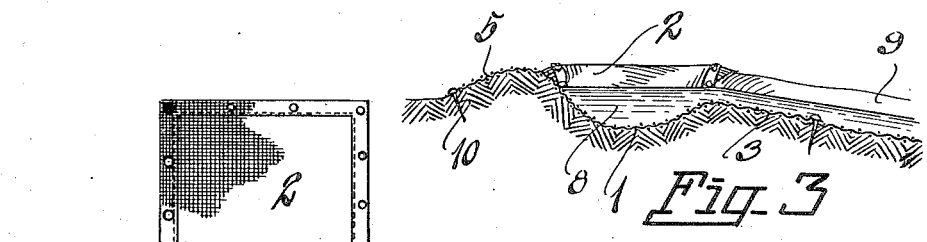
Fig. 3 is a transverse vertical section, showing the outlet from the main ditch into the lateral.

The apron of flexible material is designed to be used as a trough in the main ditch 8, and also to perform such function in the lateral ditch 9, as in Fig. 1, where the apron is shown in use. Here the wing 2 of the apron has been used as a dam by placing soil beneath the wing, in the bottom of the main ditch, and the wings 4 and 3 respectively form troughs in the main ditch 8 and the lateral 9 to prevent erosion or washing away of the soil as the water flows from the main ditch into the lateral. Around the edges of the apron stakes or spikes 10 have been driven through the eyelets 7 into the walls and bottom of the ditches to securely hold the apron in position either as a temporary expedient, or for a more permanent fixture. It will readily be seen that the lateral 9 may be closed if desired by forming a dam under the wing 3, and the soil under the wing 2 may be removed to permit continuous passage through the main ditch 8. It is also evident that the wing 5 may form the inlet trough for an additional lateral to drain water from the main ditch.

What I claim is:

An irrigation device to prevent erosion of beds and banks of streams, comprising a flexible cruciform apron to form a trough in a ditch and one of its wings adapted to co-act with a dam formed in said ditch, another wing on the apron adapted to form a trough in a lateral intersecting ditch and a third wing alined with the last mentioned wing adapted to protect a bank opposite the mouth of said lateral ditch, and means for securing said apron in place.

In testimony whereof I affix my signature.

FRANK SULLIVAN.